United States Patent [19]

Young et al.

[11] Patent Number: 4,618,898
[45] Date of Patent: Oct. 21, 1986

[54] METHOD AND APPARATUS FOR READING A DISK

[75] Inventors: Mark S. Young, Mountain View; John Drew, Los Gatos; Michael C. Shebanow, Berkeley; Vineet Dujari, San Jose, all of Calif.

[73] Assignee: Advanced Micro Devices, Inc., Sunnyvale, Calif.

[21] Appl. No.: 684,423

[22] Filed: Dec. 20, 1984

[51] Int. Cl.$^4$ .............................................. G11B 5/09
[52] U.S. Cl. ........................................ 360/51; 360/39
[58] Field of Search ................... 360/51, 39; 375/110, 375/118; 369/48

[56] References Cited

U.S. PATENT DOCUMENTS

| | | | |
|---|---|---|---|
| 4,357,707 | 11/1982 | Delury | 360/51 |
| 4,425,646 | 1/1984 | Kinoshita et al. | 360/51 |
| 4,459,623 | 7/1984 | Glenn, II | 360/51 |
| 4,472,818 | 9/1984 | Zapisek et al. | 360/51 |

Primary Examiner—Vincent P. Canney
Attorney, Agent, or Firm—Patrick T. King; Warren M. Becker; J. Vincent Tortolano

[57] ABSTRACT

A method and apparatus for reading data from a disk having missing or unreadable field address marks. Expected address marks are searched for within a time window which is generated using a counter. When an expected address mark is generated at any time within the time window, the counter is set or reset to generate another time window within which the next address mark is expected to occur. By starting or restarting the counter each time an expected address mark is detected the effects of variations in spindle speed which occur prior to the detection of the address mark are eliminated, thus increasing the probability that readable address marks will be detected within a time window.

10 Claims, 11 Drawing Figures

METHOD AND APPARATUS FOR READING A DISK

BACKGROUND OF THE INVENTION

1. Field of the Invention

The present invention relates to reading data from a disk in general and to a method and apparatus comprising reading data from a disk having missing or unreadable field address marks in particular.

2. Description of Prior Art

Disks used for storing data comprise a plurality of concentric tracks. Typically, each of the tracks comprises an index mark and is divided into a plurality of sectors, e.g. 0, 1, 2, 3 . . . n. Each of the sectors comprises a plurality of fields including an identification field and a data field. Each of the identification and data fields comprises an address mark.

In practice, the location of a sector on a disk need not correspond physically to the number used to identify it. For example, a sector identified as sector 5 may be physically the third sector from the index mark. To distinguish the two types of sector designations herein, the former is called a logical sector and the latter is called a physical sector. Thus, in the given example, logical sector 5 is physical sector 3.

When a particular logical sector is selected, the address mark associated with each field in the sectors is used as a control signal for commencing the reading of the selected sector. For example, if it is desired to read the data in logical sector 5 of a particular track, control circuitry in a disk controller detects each of the address marks and identification fields as they pass under a read head. When the control circuitry detects the address mark and reads the identification field associated with the logical sector 5, it searches for the next address mark associated with the data field and reads the data field.

Since the reading of data from a selected logical sector ordinarily depends on the presence and readability of two address marks in each logical sector, the failure of the control circuitry to detect one or more of the marks in any of the logical sectors can result in an inability to read a selected logical sector or a reading of the wrong logical sector. When this occurred in the past, it was necessary to use other methods to read a selected logical sector.

Heretofore, one of the methods used to recover data from a selected logical sector when one or more address marks on a track had been rendered unreadable comprised using a map of the location of the logical sectors on a disk to identify the physical sector corresponding to the selected logical sector and a counter.

In practice, the counter was loaded with the location of the physical sector, started by the index mark and incremented at a rate corresponding to the angular velocity of the disk, also called disk spindle speed. When the counter reached a predetermined count corresponding to the selected physical sector, an attempt was made to read data from the disk for a predetermined period corresponding to the length of the data field therein.

The foregoing described use of a counter to recover data was sufficient so long as the angular velocity of the disk was constant. Frequently, it was possible to miss the correct field (ID or data) and read the wrong field.

Another method which has been used for recovering data from a disk with unreadable field address marks has involved reading all of the data from a track and thereafter, by visual inspection, attempting to identify the selected data. In practice, however, this method is often impracticable.

SUMMARY OF THE INVENTION

In view of the foregoing, a principal object of the present invention is a novel method and apparatus for reading data from a disk having missing or unreadable field address marks.

Another object of the present invention is a method and apparatus for reading data from a disk having missing or unreadable critical portions of an identification field associated with the data.

Another object of the present invention is a method and apparatus as described above comprising a self-adapting timing mechanism that uses imbedded features of a disk format, such as detectable address marks and the disk data itself, to compensate for disk spindle speed variations.

Still another object of the present invention is a method and apparatus as described above comprising an apparatus for estimating the location of selected imbedded features of a disk format, such as detectable address marks.

In accordance with the above objects, there is provided a method and an apparatus for selectively reading an identification or a data field in a selected physical sector which has a known numerical position relative to an index mark. Once the index mark is detected, the apparatus begins searching for one or more address marks which identify the beginning of each of the identification and data fields in each of the physical sectors on the disk. In response to a control signal corresponding to a preselected field in a selected physical sector, the apparatus will search for the address mark associated with that field and when it is detected, read out the data from that field.

To the extent described above, the apparatus of the present invention functions in much the same manner as conventional disk reading apparatus. There is, however, a significant difference. In the present invention, the apparatus does not simply search for a selected address mark but, rather, searches for an address mark within a certain time period after detecting an index mark. The time period of "window" is provided by a counter.

In operation, the counter enables an address mark detector for the period of the window which extends from a first predetermined time prior to when an address mark is expected to a second predetermined time after the address mark is expected.

If the spindle speed of a disk is constant and all field address marks on the disk are readable, the apparatus will detect an address mark at the expected time. However, if the disk spindle speed varies, an address mark may be detected before or after the expected time. For example, if the disk spindle speed is higher than expected, the address mark will be detected before the expected time. If the disk spindle speed is lower than expected, the address mark will be detected after the expected time.

Whether the disk spindle speed is higher or lower than expected, each time an address mark is detected within a given window, the counter is reset to begin counting from the time that the address mark was detected. In this manner, the period within which the next window occurs is determined by the occurrence of the previously detected address mark and not by the occurrence of the index mark. Thus, the effect of disk spindle speed variations preceding the resetting of the counter are eliminated.

If, on the other hand, certain address marks are missing or unreadable during the period of a window, the counter continues to generate succeeding windows until an address mark is detected, at which time it is reset as described above.

While the address mark associated with a selected field in a selected physical sector must be detected in order to read the field, it will be appreciated that so long as the disk spindle speed variations do not exceed a predetermined magnitude between detected address marks, the apparatus of the present invention is capable of reading the selected field even though one or more preceding address marks are missing or unreadable.

BRIEF DESCRIPTION OF THE DRAWING

The above and other objects, features and advantages of the present invention will become apparent from the following detailed description of the accompanying drawing in which.

DETAILED DESCRIPTION OF THE DRAWING

Figure 1:
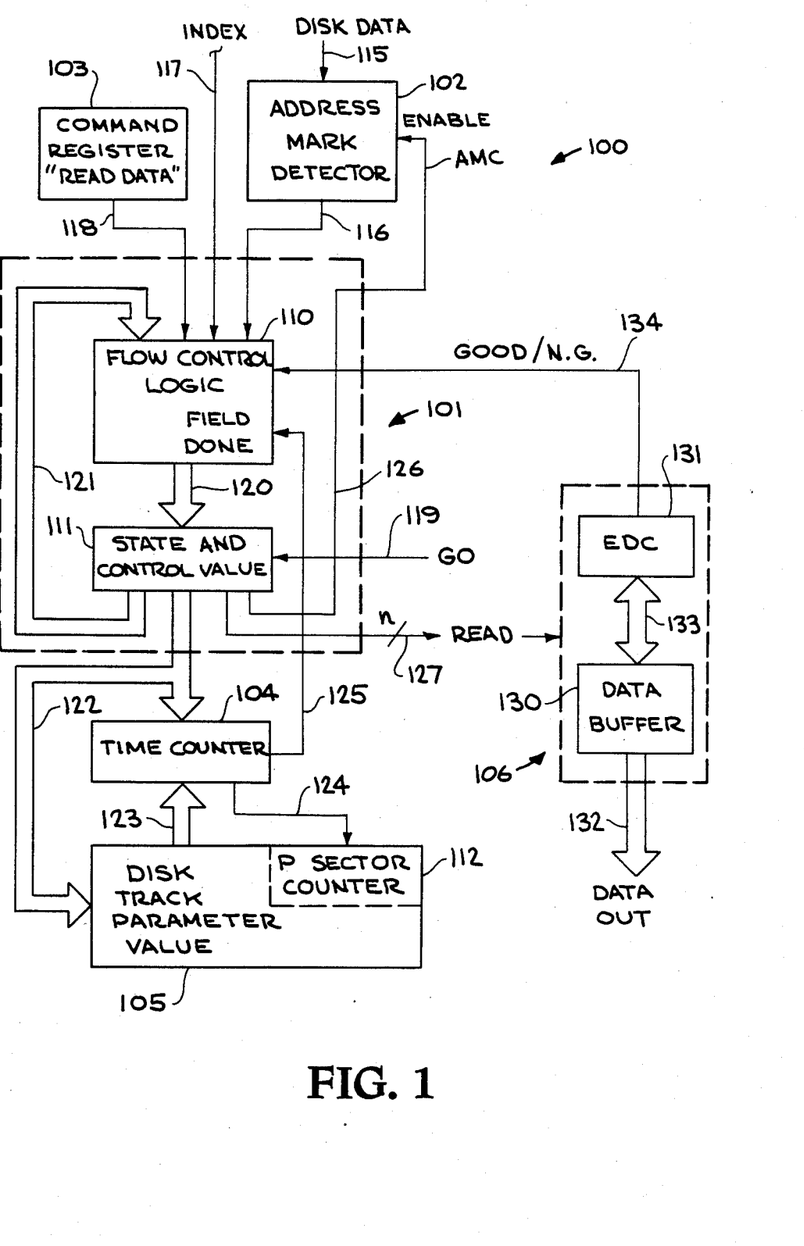
FIG. 1 is a block diagram of an apparatus embodying the present invention.

Referring to FIG. 1, there is provided in accordance with the present invention a disk controller apparatus designated generally as 100. In the apparatus 100 there is provided a state machine designated generally as 101, an address mark detector circuit 102, a command register 103, a time counter 104, a disk track parameter value circuit 105 and a data transfer circuit 106.

In the state machine 101 there is provided a flow control logic circuit 110 and a state and control value circuit 111. In the disk track parameter value circuit 105, there is provided a physical sector, or p sector counter, 112.

The address mark detector circuit 102 is provided with an input line 115 for receiving disk data, including an address mark, from a disk, an output line 116 coupled to the flow control logic circuit 110 for indicating when an address mark has been detected and an address mark enable control (AMC) signal on a line 126. The flow control logic circuit 110 is provided with an input line 117 on which is provided a signal corresponding to a detection of an index mark on the disk. The command register 103 is provided with an output line 118 coupled to the flow control logic circuit 110 for providing to the flow control logic circuit 110 a signal indicating whether a data field or an identification field is to be read.

Extending from the flow control logic circuit 110 to corresponding inputs of the state and control value circuit 111 there is provided a control signal bus 120. Coupled to corresponding inputs of the flow control logic circuit 110 there is provided a control circuit bus 121. Extending from the state and control value circuit 111 and coupled to corresponding inputs of the time counter 104 and the disk parameter value circuit 105 there is provided a control bus 122. Extending from the disk track parameter value circuit 105 and coupled to corresponding inputs of the time counter 104 there is provided a control bus 123. The time counter 104 is further provided with a line 124 coupled to the p sector counter 112, and a line 125 coupled to the flow control logic circuit 110. The state and control valve circuit 111 is coupled to the address mark detector 102 by means of a line 126 and to the data transfer circuit 106 by means of a bus 127. A GO control signal is provided on a line 119 to the state and control value circuit 111.

In the data transfer circuit 106 there is provided a data buffer 130 and an error detection and correction circuit (EDC) 131. The data buffer circuit 130 provides an output on a data output bus 132 and is coupled to the EDC 131 by means of a bus 133. The EDC 131 is coupled to the flow control logic circuit 110 by means of a line 134.

Figure 2:
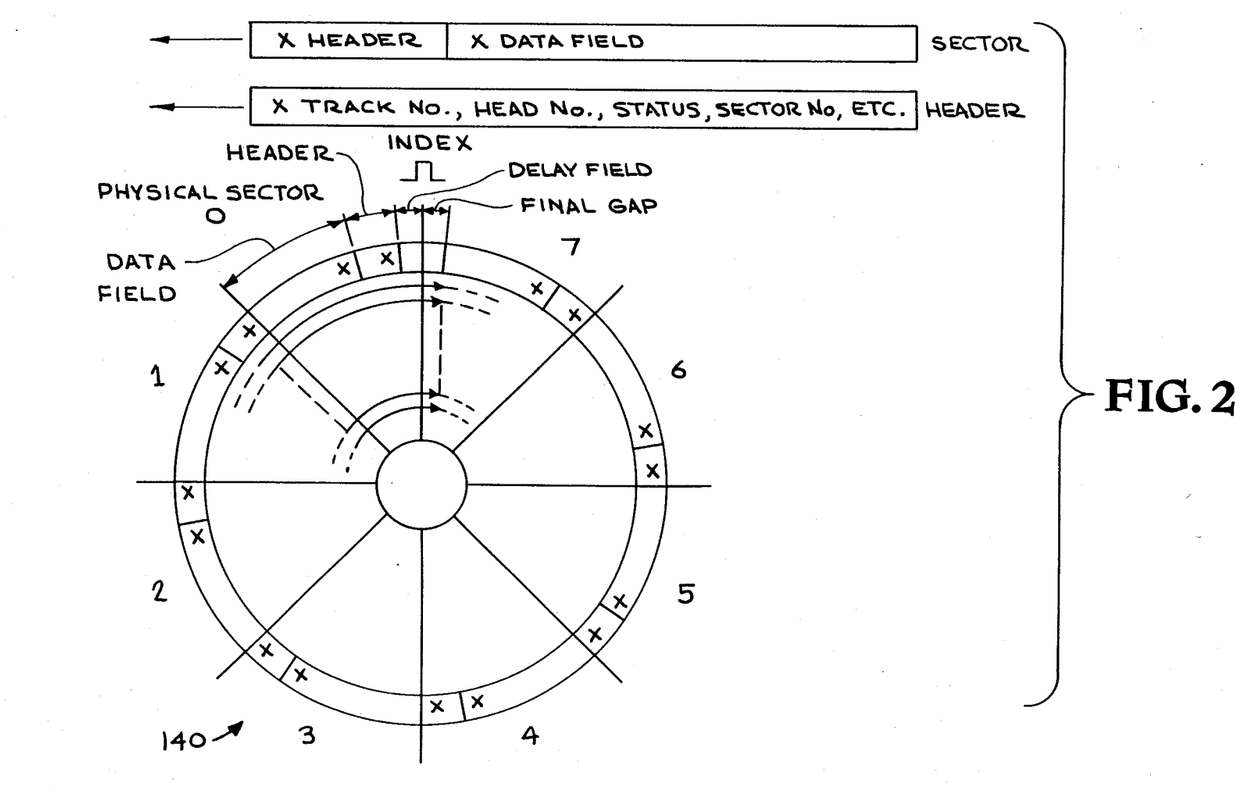
FIG. 2 is a representation of a magnetic disk with which the present invention is used.
Figure 3A:
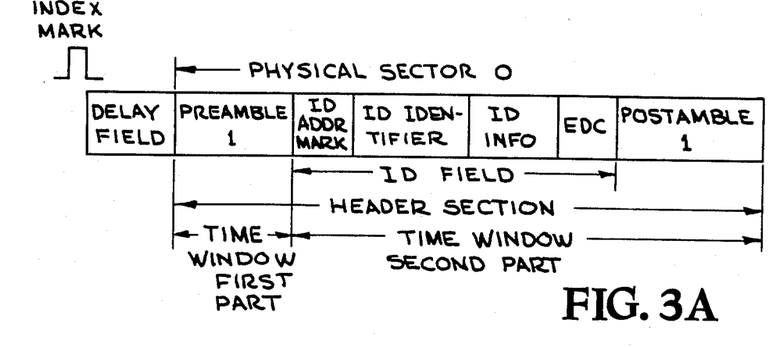
FIGS. 3A-3D are representations of sectors on the disk of FIG. 2.
Figure 3B:
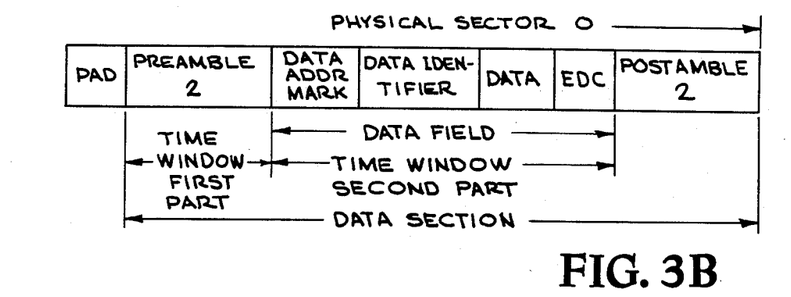
Figure 3C:
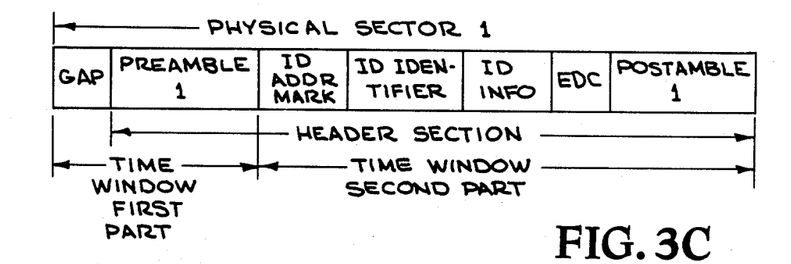
Figure 3D:
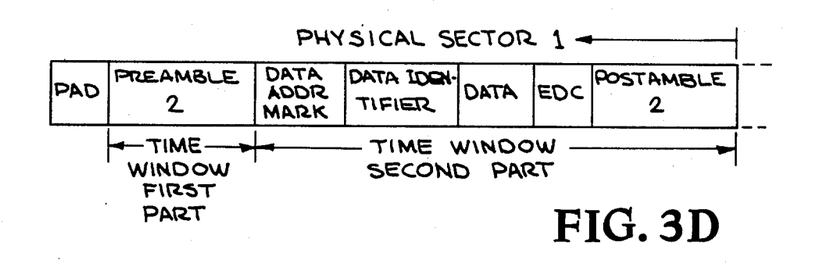

Referring to FIG. 2, there is shown a magnetic disk, such as a floppy or a hard disk, designated generally as 140. In the disk 140 there is provided a plurality of sectors designated 0-7. At the beginning of sector 0 there is provided an index mark represented as a pulse. In each of the sectors there is provided a header section and a data field section. In addition, in sector 0 there is provided preceding the header section a DELAY field. In sector 7 there is provided at the end of the data field a FINAL GAP field. The DELAY field is provided to prevent storing data within a predetermined distance from the leading edge of the index mark. The FINAL GAP field provides a buffer for variations in disk spindle speed during track initialization and for any excess data that could not be fitted onto another sector and typically comprises a length corresponding to a number of bytes less than one sector in length.

In the header section there is provided identifying information such as track number, head number, status, sector number, and the like. In the data field section there is typically provided a data record and an error detection and correction check sum.

As will be described in further detail below, the sectors on a disk, such as the disk 140, may be characterized as either logical sectors or physical sectors. A logical sector is identified by a number when the disk is formatted in a conventional manner. The number assigned to a logical sector has little, if any, relationship to its physical location on the disk relative to the index mark. On the other hand, a physical sector is by definition identified by a number which corresponds to its physical location relative to the index mark. For example, if a logical sector 5 is physically the third sector from the index mark which would be encountered as the disk is rotated in a normal fashion, the logical sector 5 would correspond to a physical sector 3.

From the foregoing it will be appreciated that what is shown in FIG. 2 is a diagram of physical sector locations as distinguished from logical sector locations. The distinction is important because, as will become apparent, the present invention comprises a method and apparatus for identifying and reading identification and data fields in physical sectors as distinguished from logical sectors.

Referring to FIGS. 3A-3D, there is shown a representation of typical fields in the physical sector 0 and physical sector 1 of disk 140. In each of the sectors there is provided a header section and a data section. In the physical sector 0 the header section is preceded by a delay field. In the header section there is provided a PREAMBLE 1 field, an identification address mark field (ID ADDR MARK), an ID identifier field, an ID information field, an error detection and correction code (EDC) field and a POSTAMBLE 1 field. Preceding the data section there is provided a PAD field. In the data section there is provided a PREAMBLE 2 field, a data address mark field, a data identifier field, a data record field, an error detection and correction (EDC) field and a POSTAMBLE 2 field. In physical sector 1 there is provided preceding the header section a GAP field. The remaining portions of the physical sector 1 are identical to the corresponding portions in physical sector 0. Indeed, all of the physical sectors are identical except that there is provided at the end of the POSTAMBLE 2 field of the last physical sector 7 a FINAL GAP field.

As used in the flow diagrams to be described below, the identification field in each of the physical sectors comprises the ID ADDR MARK, ID IDENTIFIER, ID INFO, and EDC fields. The data field comprises the data address mark, data identifier, data, and EDC fields.

For purposes of the present invention, the header section and the data section comprise a time window which is divided into a first part and a second part. The first part of the time window of the header section of physical sector 0 encompasses the PREAMBLE 1 field. The second part of the time window of the physical sector 0 comprises the ID ADDR MARK, ID IDENTIFIER, ID INFO, EDC and POSTAMBLE 1 fields. The first part of the time window of the data section comprises the PREAMBLE 2 field. The second part of the time window of the data section of physical sector 0 comprises the data address mark, the data identifier, data and EDC fields. In physical sector 1 and subsequent physical sectors, the time window of the first part of the header section is extended to include the GAP field.

As will be apparent from the foregoing description, with the exception of the DELAY field and the FINAL GAP field, the time windows of the header and data sections of each of the physical sectors are separated by the PAD field while the data section of one physical sector is separated from the header section of a succeeding physical sector by the POSTAMBLE 2 fields of each section. Thus the POSTAMBLE 2 and PAD fields provide a separation between successive time windows.

In operation, the use of the apparatus and method of the present invention is initiated with a read absolute command. The read absolute command is used after it has been determined that a desired logical sector on a disk is unreadable using normal or conventional disk reading techniques.

The read absolute command is to be distinguished from a conventional read command. A conventional read command comprises a logical sector number or identifier which identifies and is used to read a sector regardless of the physical position or location of the sector on a disk. In contrast, the read absolute command comprises a physical sector number or identifier which identifies a sector on the disk by reference to its physical location on the disk relative to an index mark on the disk. For example, assuming that there are n sectors in a track on a disk, the sectors will be numbered 0, 1, 2, .. . . If, after looking at a map of the logical sectors on a disk or by some other means, it is determined that logical sector 5 physically comprises the third sector from the index mark, it will be identified for purposes of the execution of the read absolute command as the physical sector 2 or simply, p sector 2.

When using the read absolute command to find and read a particular sector in a track on a disk, in addition to identifying the physical location of the sector, i.e. the p sector number, the command also requires that the user thereof identify whether the user wishes to read the identification field (ID field) or the data field in that sector. Thus, when using the read absolute command, the number of the physical sector is stored in the p sector counter 112 and a number corresponding to the ID or DATA field is stored in the command register 103.

Figure 5:
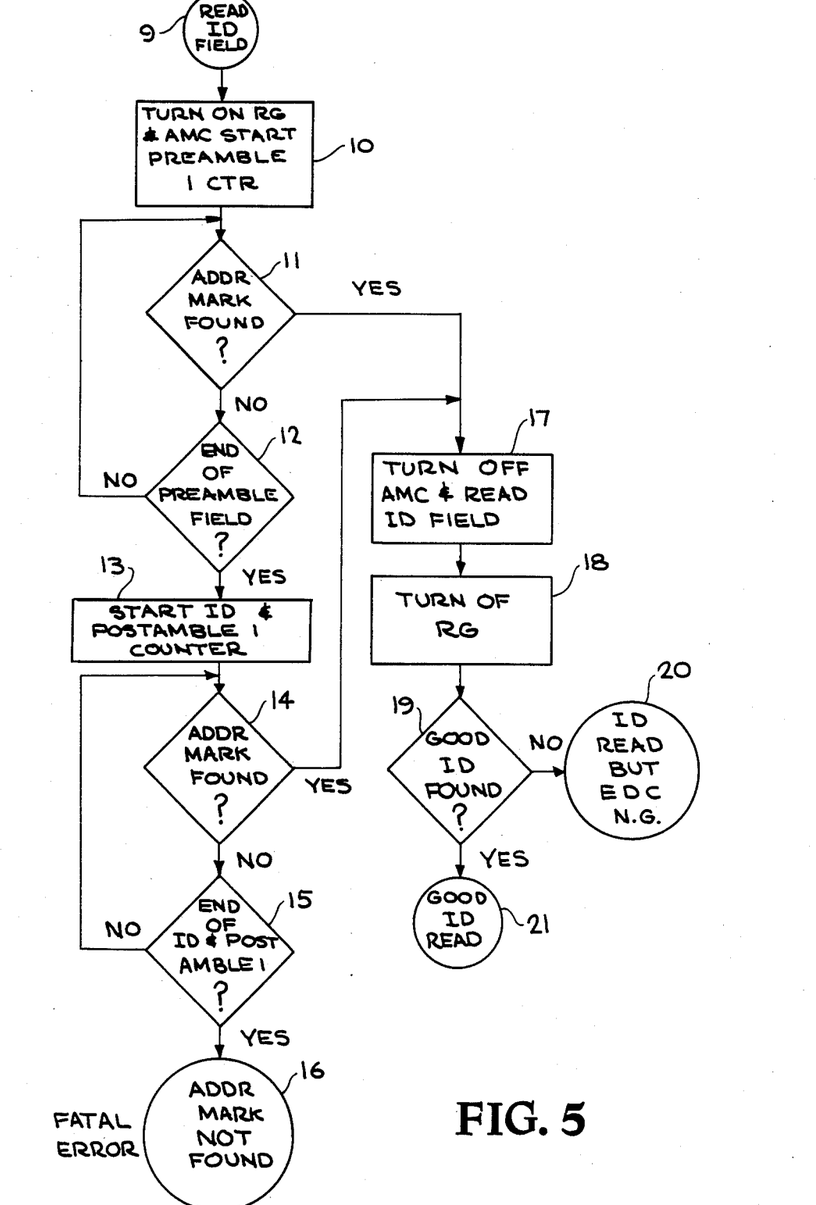
Figure 6:
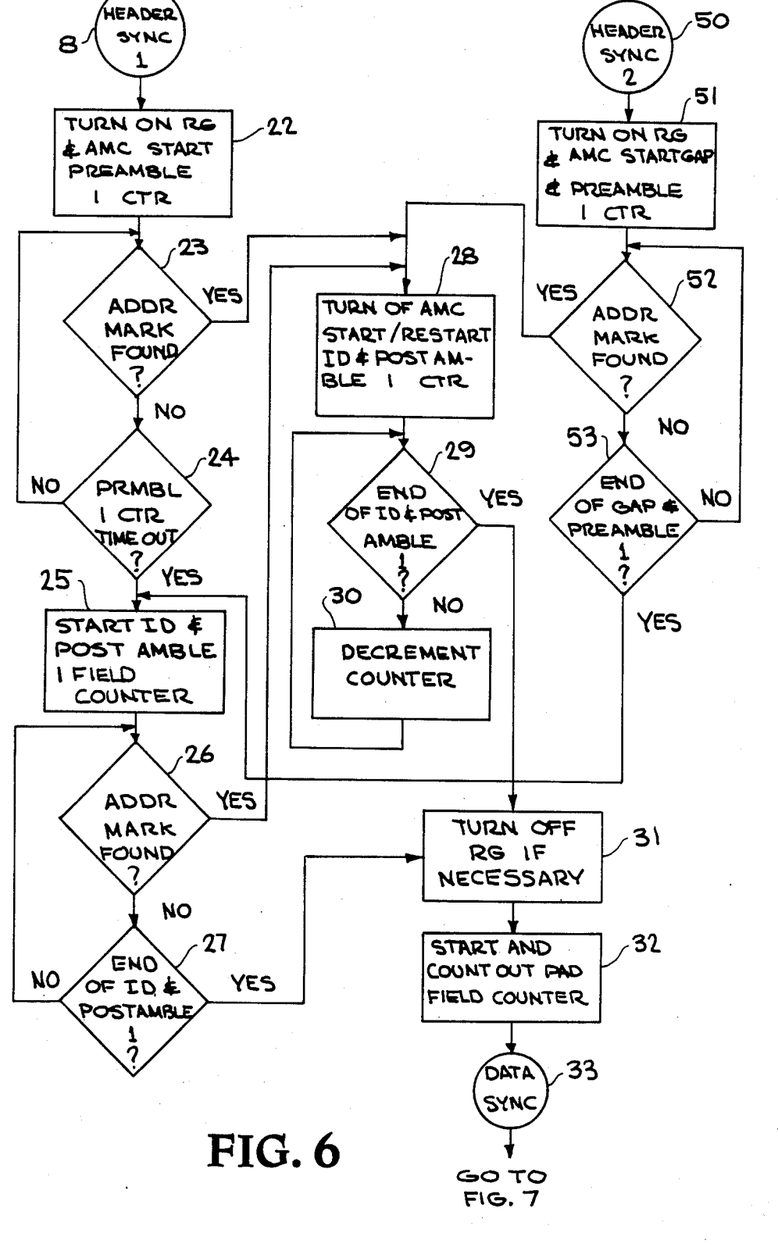
Figure 7:
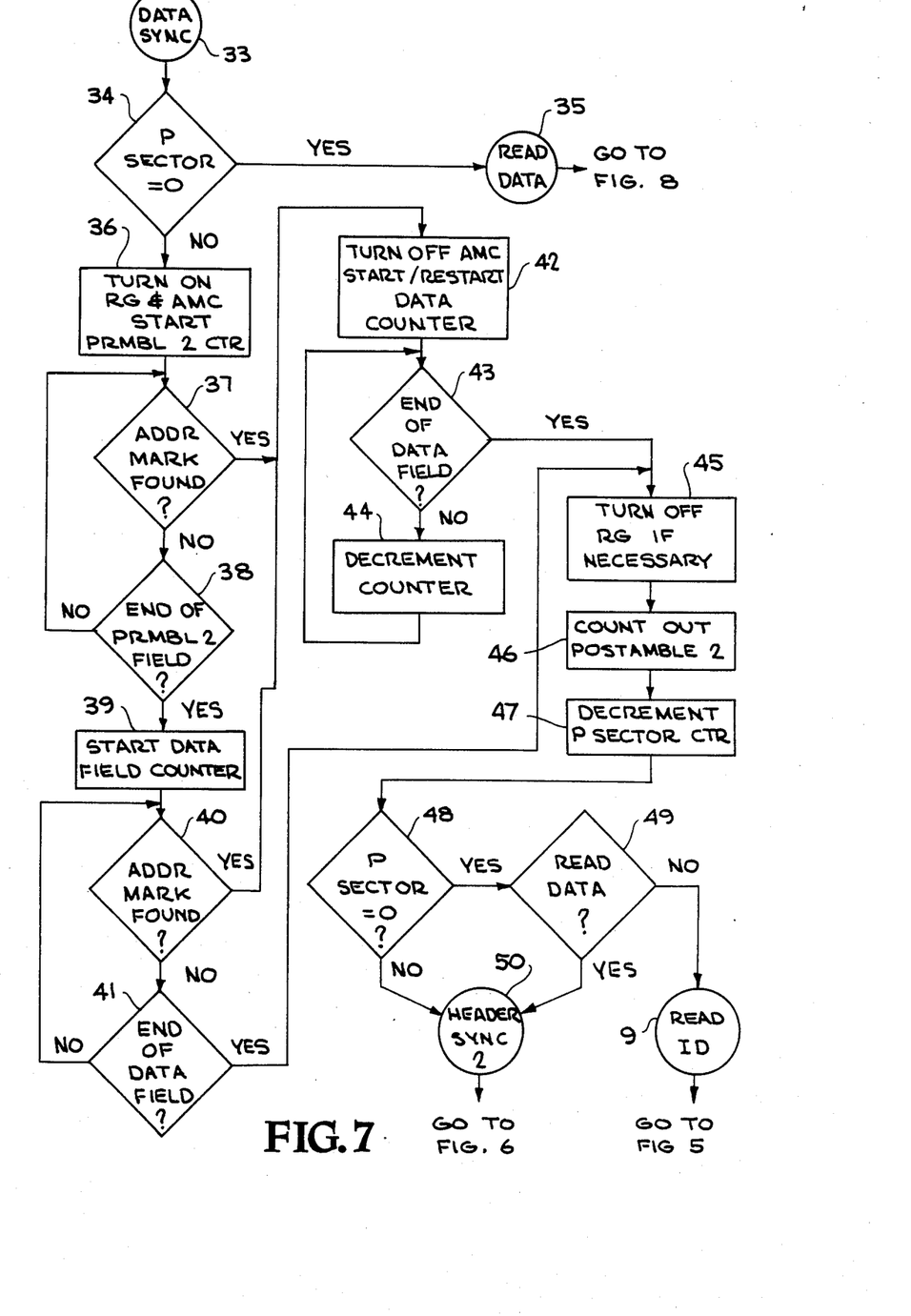

Referring to the blocks in the flow charts (FIGS. 4-8) and the other figures, and assuming that it is desired to read the data field of physical sector 2, at the start (FIG. 1, block 1), numbers corresponding to physical sector 2 and a "Read DATA " command are inserted in the p sector counter 112 and the command register 103, respectively. Thereafter, a GO signal on the line 119 causes the circuit 111 to require the circluit 110 to respond to the occurrence of an index mark on the disk. The state machine 101 then searches for the beginning of the index mark (block 2). When the rising edge of the index mark is found, the state machine 101 directs the circuit 105 to load the time counter 104 with a number corresonding to the length of the delay field (block 3). The time counter 104 is then repeatedly decremented to count out the delay field (blocks 3, 4 and 5). After the delay field has been counted out, the apparatus 100 in response to a field done signal on line 125 checks the status of the physical sector counter 112 (block 6). If the physical sector counter 112 has not been decremented to zero, the apparatus 101 begins what is called a header sync 1 operation (FIG. 6, block 8).

In the header sync 1 operation, the apparatus 100 generates a time window within the header, searches for an ID address mark (ID ADDR MARK) and, if an when the mark is detected, synchronizes the time counter 104.

When the apparatus 101 begins the header sync 1 operation, it turns on a read gate (RG) in the detector circuit 102, generates an enabling control signal on line 126 for enabling the address mark detector 102 and starts the PREAMBLE 1 counter 104 (block 22).

As used herein, the starting of a counter simply means that the state machine 101 causes the circuit 105 to load a number corresponding to the length of a given field or the sum of the lengths of plural fields in the counter 104. Since the loading step usually comprises a period of one clock pulse, the counter is decremented by that amount when it is loaded. Thereafter, the counter is counted down.

Figure 4:
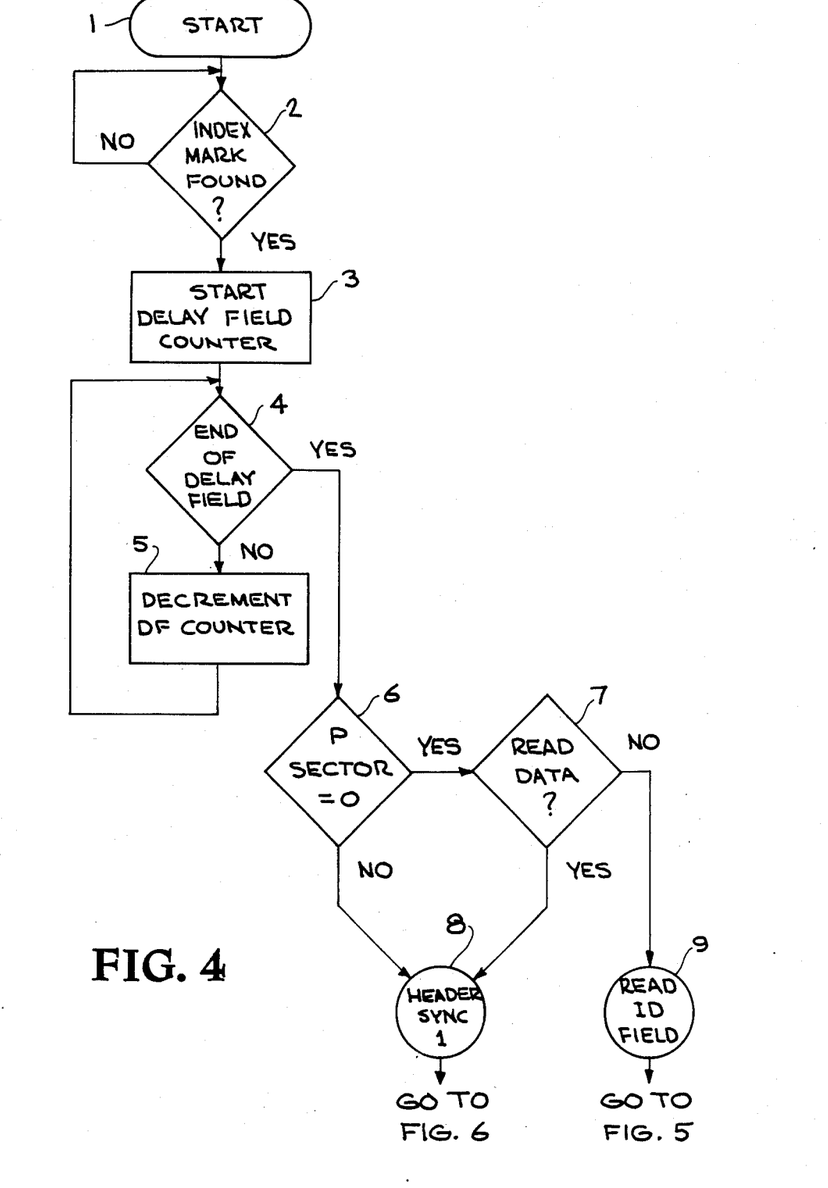
FIGS. 4-8 comprise a flow diagram embodying features of the present invention.

During the time that the PREAMBLE 1 counter 104 is being counted down, the apparatus 101 looks for the ID address mark in physical sector 0 (block 23). If an ID address mark is not found by the time the PREAMBLE 1 counter 104 is counted down (block 24), the apparatus 101 loads the time counter 104 with a number corresponding to the sum of the lengths of the ID and POSTAMBLE 1 fields and begins counting down the counter (blocks 25 and 26). During the time that the time counter 104 is counting down the length of the ID and POSTAMBLE 1 fields, the apparatus 101 continues searching for the ID address mark in the physical sector 0 (block 26). If the time counter 104 is counted down before the ID address mark in physical sector 0 is found (block 27), the apparatus 101 turns off the read gate and the address mark enable control AMC to the address mark detector 102 (block 31), starts and counts out the PAD field counter (block 32) and begins what is called a data sync operation (FIG. 4, block 33).

In the data sync operation, the apparatus 101 generates a time window, searches for a data address mark (DATA ADDR MARK) within the window and, if and when the mark is detected, synchronizes the time counter 104.

On beginning the data sync operation, the apparatus 101 checks the p sector counter 112 (block 34). If the p sector counter 112 has not been decremented to zero, the apparatus 100 turns on the read gate (RG), enables the address mark detector 102 and starts the PREAMBLE 2 counter 104 (block 36). While the PREAMBLE 2 counter 104 is being decremented, the apparatus 100 searches for the data address mark of physical sector 0 (block 37). If the data address mark of physical sector 0 is not found by the time that the PREAMBLE 2 counter 104 has counted out the length of the PREAMBLE 2 field (block 38), the apparatus 100 starts the data field length counter 104 (block 39). While the time counter 104 is counting out the length of the data field, it looks for the data address mark of the physical sector 0 (block 40). If no data address mark for physical sector 0 is found before the time counter 104 counts out the data field (block 41), the apparatus 101 turns off the read gate RG and the address mark control enable signal AMC to control 102 (block 45). Thereafter, the apparatus 100 starts and counts out the POSTAMBLE 2 field length counter 104 (block 46) and decrements the physical sector counter 112 (block 47).

It is important to note here that the decrementing of the physical sector counter 112 must be done in such a manner that no time is lost relative to the rotation of the disk. This can be accomplished in a number of ways. One way is to use a counter which is separate from counter 104 and which is decremented in parallel with the operation of counter 104. Another way utilizes the knowledge that the ID field, like other fields on the disk, has a predetermined length. With this knowledge, the time which would otherwise be used to decrement the ID field counter 104 described above with respect to FIG. 6, blocks 29 and 30, can be used instead for decrementing the physical sector counter 112.

After the physical sector counter 112 is decremented, the apparatus 100 checks the status of the physical sector counter 112 to determine whether it has been decremented to zero. If not, the apparatus 100 begins what is called a header sync 2 operation (FIG. 6, block 50).

A header 2 sync operation is required because the GAP field (from the previous data sector) is a variable size field. Although it is given a predetermined size upon track initialization, many data field updates later, the GAP may have greatly expanded or contracted in size. If it has greatly contracted in size (i.e. essentially nonexistent), the timing sequence of the present method could easily miss the address mark of the next ID field. Hence, the present method must look for the next ID field address mark starting from the GAP of the previous sector.

In the header sync 2 operation, the apparatus 100, turns on the read gate RG, enables the address mark detector 102 and starts the GAP and PREAMBLE 1 (physical sector 1) counter 104 (block 51). While the GAP and PREAMBLE 1 (physical sector 1) counter 104 is being counted down, the apparatus 100 searches for the next ID address mark. If the mark is not detected, the apparatus repeats the above-described sequence of operations beginning with the operations identified with respect to block 25.

In the above description of FIGS. 4–8, it was assumed that neither the ID address mark nor the data address mark in physical sector 0 was found. If, on the other hand, the ID address mark had been found before the PREAMBLE 1 counter 104 had been timed out (block 23), as would occur if disk spindle speed was faster than expected, or it had been found during the counting down of the ID field length counter (block 26), as would occur if the disk spindle speed was slower than expected, then the field length counter 104 would have been respectively started or restarted immediately (block 28). In either case, it will be appreciated that the detection of the ID address mark for physical sector 0 and the starting or re-starting of the ID field length counter 104 would compensate for any disk spindle speed variation preceding the detection of the ID address mark.

Similarly, if the data address mark of physical sector 0 had been found during the counting down of the PREAMBLE 2 counter 104 (block 37), as would have occurred if the disk spindle speed was faster than expected, the apparatus 101 would have started the data field length counter 104 immediately. If, on the other hand, the data address mark of physical sector 0 had been detected during the counting down of the data field length counter 104 (block 40), as would have occurred if the disk spindle speed was slower than expected, then the apparatus 100 would have re-started the data field length counter 104 immediately (block 42).

In either case the detection of the address mark in physical sector 0 and the starting or re-starting of the data field length counter 104 would have compensated for any disk spindle speed variation which occurred prior to the detection of the data address mark.

The above-described operations will continue until the physical sector counter 112 (blocks 6, 34 and 48) has been decremented to zero.

When the physical sector counter 112 has been decremented to zero, the apparatus 100 will provide a signal on line 27 and will read either the ID field (FIG. 5, block 9) or the data field (FIG. 8, block 35), depending upon whether the initial read absolute command called for reading the ID field or the data field.

If the command loaded into the register 103 called for the reading of the ID field, the apparatus 100 turns on the read gate, enables the address mark detector 102 and starts the PREAMBLE 1 counter (block 10). If the ID address mark is not found during the counting down of the PREAMBLE 1 counter, the apparatus 100 starts the ID and POSTAMBLE 1 counter (block 13). If the ID address mark is not found during the counting down of the ID and POSTAMBLE 1 counter (block 14), an indication is provided that the address mark was not found (block 16). On the other hand, if the address mark was found during the counting down of either the PREAMBLE 1 counter or the counting down of the ID and POSTAMBLE 1 counter, the apparatus 100 disables the address mark detector, reads the ID field and turns off the read gate and the address mark control AMC (block 17, 18). Thereafter, the determination is made (block 19) by means of a signal on the line 134 as to whether the ID field data was good (block 21) or not good (block 20).

Figure 8:
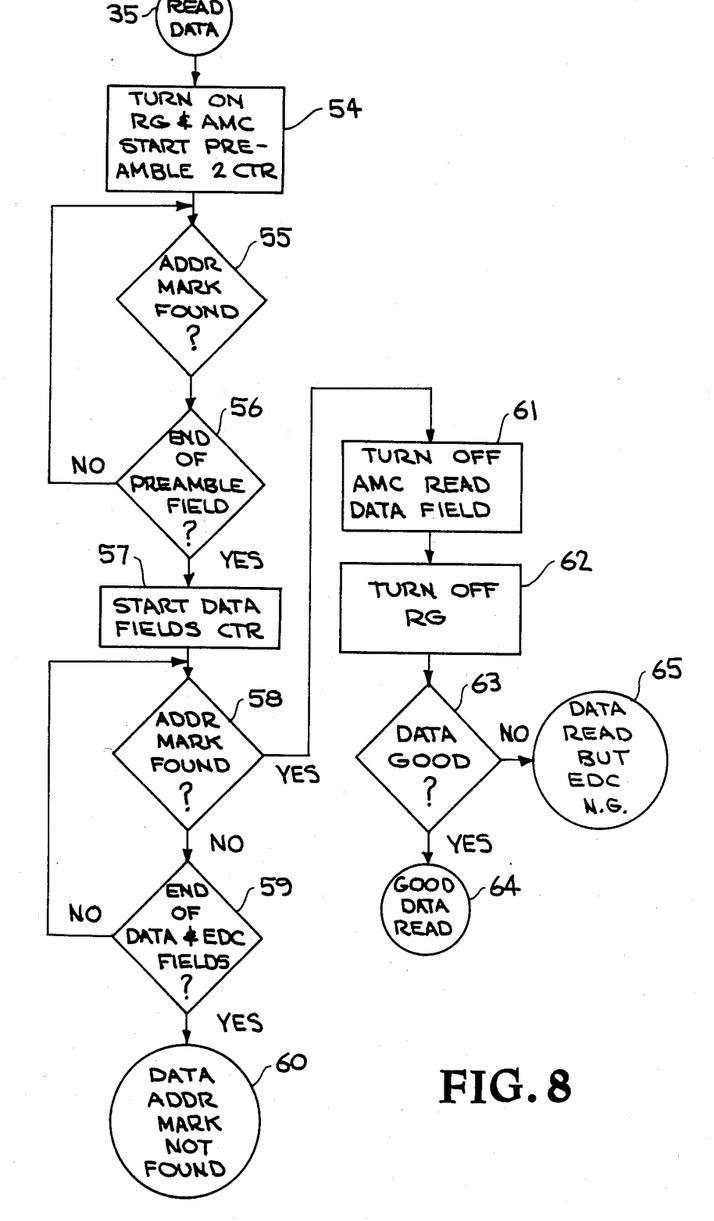

Similarly, if the read absolute command called for the reading of a data field, the apparatus 100 turns on the read gate RG, enables the address mark detector 102 and starts the PREAMBLE 2 counter (block 54). If the data address mark is not found during the counting down of the PREAMBLE 2 counter (block 55), the apparatus 100 starts the data counter (block 57). If the data address mark is not found during the counting down of the data counter (block 58), an indication is provided that the data address mark was not found (block 60). If, on the other hand, the address mark was found during the counting down of the PREAMBLE 2 counter or the counting down of the data field counter, the apparatus 100 disables the address mark detector 102, reads the data field and turns off the read gate and the address mark control AMC (block 61, 62). After the data field is read, the apparatus 101 provides an indication (block 63) as to whether the data read was good (block 64) or not good (block 65).

While a preferred embodiment of the invention is described above, it is contemplated that various modifications may be made thereto without departing from the spirit and scope of the invention. For example, the number of fields used for generating the first and second parts of each time window may vary depending upon the procedure used to format a particular data disk. Similarly, the size of the time windows may be changed and by appropriate software and hardware the time windows need not begin and terminate at the beginning or ending of any particular field, but may begin and end within the boundaries of particular fields. Also, the number of sectors on a disk may vary. Accordingly, it is intended that the above description be considered only as illustrative of the invention and that the scope of the invention be determined by the claims hereafter provided.

What is claimed is:

1. A method of reading a selected field from among a plurality of fields on a disk wherein said disk comprises a plurality of field address marks, each of said plurality of fields having one of said field address marks associated therewith and wherein one or more of said field address marks, other than the address mark associated with said selected field, is unreadable and said disk comprises an index mark and a spindle speed which may vary, comprising the steps of:
   detecting said index mark;
   generating signals for providing a first plurality of successive time windows in response to said detecting of said index mark, wherein each of said time windows is associated with a predetermined one of said plurality of address marks and occurs at a time and has a duration within which said associated one of said address marks is expected to occur;
   enabling an address mark detecting apparatus during each of said time windows for detecting an address mark which may occur within said time window;
   restarting said generating step to provide another plurality of said successive time windows each time one of said address marks is detected within an associated one of said plurality of time windows; and
   reading said selected one of said predetermined fields when the address mark associated with said selected field is detected within said time window associated therewith.

2. A method according to claim 1 wherein said generating step comprises the step of generating a time window having a width which is greater than twice the maximum expected variation of disk spindle speed between expected adjacent address marks.

3. A method according to claim 1 wherein said generating step comprises the step of generating successive time windows which are separated by at least one of said plurality of fields.

4. A method of reading a selected one of a plurality of predetermined fields in a selected physicaal sector in an apparatus having a disk comprising a plurality of fields, an address mark associated with said predetermined ones of said fields and a disk spindle speed which may vary, comprising the sequential steps of:
   (a) storing a number in a physical sector counter which corresponds to said selected physical sector;
   (b) storing a number in a command register corresponding to said selected one of said predetermined fields in said selected physical sector;
   (c) loading a counter with a number corresponding to the length of a PREAMBLE 1 field;
   (d) counting down said counter;
   (e) checking for an expected address mark while said counter is being counted down;
   (f) loading said counter with a number corresponding to the sum of the lengths of an ID field and a POSTAMBLE 1 field if said expected address mark is detected during said latter counting down of said counter and go to step (j), but if said expected address mark is not detected, loading said counter with a number corresponding to the sum of the length of said ID and POSTAMBLE 1 fields and go to step (g);
   (g) counting down said counter;
   (h) checking for said expected address mark during said latter counting down of said counter;
   (i) reloading said counter with a number corresponding to the sum of the lengths of said ID and POSTAMBLE 1 fields if said expected address mark is detected during said latter counting down of said counter and go to step (j), but if said first expected address mark is not detected, go to step (k);
   (j) counting down said counter;
   (k) loadng said counter with a number corresponding to the length of a PAD field when said counter has reached a state corresponding to the end of said POSTAMBLE 1 field;
   (l) counting down said counter;
   (m) checking said physical sector counter to see if said physical sector counter has been decremented to zero;
   (n) checking for an address mark associated with said selected one of said predetermined fields if said physical sector counter has been decremented to zero, and if said address mark is detected, read said field and if not, go to step (o);
   (o) loading said counter with a number corresponding to the length of a PREAMBLE 2 field;
   (p) counting down said counter;
   (q) checking for an expected address mark while said counter is being counted down;
   (r) loading said counter with a number corresponding to the sum of the lengths of said DATA and EDC fields if said expected address mark is detected during said latter counting down of said counter and go to step (v), but if said second expected address mark is not detected, loading said counter with a number corresponding to the sum of the lengths of said DATA and EDC fields and go to step (s);

(s) counting down said counter;

(t) checking for said expected address mark during said latter counting down of said counter;

(u) reloading said counter with a number corresponding to the sum of the lengths of said DATA and EDC fields if said expected address mark is detected during said latter counting down of said counter and go to step (v), but if said second expected address mark is not detected, go to step (w);

(v) counting down said counter;

(w) loading said counter with a number corresponding to the length of a POSTAMBLE 2 field when said counter has reached a state corresponding to the end of said EDC field and counting out said counter;

(x) decrementing said physical sector counter;

(y) checking the status of said physical sector counter to see if it has been decremented to zero and if it has been decremented to zero, (i) check said command register to identify the field to be read, (ii) check for the address mark associated with the field selected and (iii) if the address mark is detected, read the field and terminate the step, if not, go to step (z);

(z) loading said counter with a number corresponding to the sum of the lengths of a GAP field and a succeeding PREAMBLE 1 field and go to step (d).

5. A method of reading a selected one of a plurality of predetermined fields in a selected physical sector in an apparatus having a disk comprising a plurality of fields, an address mark associated with said predetermined ones of said fields and a disk spindle speed which may vary, comprising the sequential steps of:

(a) storing a number in a physical sector counter which corresponds to said selected physical sector;

(b) storing a number in a command register corresponding to said selected one of said predetermined fields in said selected physical sector;

(c) loading a counter with a number corresponding to the length of a predetermined field;

(d) counting down said counter;

(e) checking for an expected address mark while said counter is being counted down;

(f) loading said counter with another number if said expected address mark is detected during said latter counting down of said counter and go to step (j), but if said expected address mark is not detected, loading said counter with said latter number and go to step (g);

(g) counting down said counter;

(h) checking for said expected address mark during said latter counting down of said counter;

(i) reloading said counter with said latter number if said expected address mark is detected during said latter counting down of said counter and go to step (j), but if said first expected address mark is not detected, go to step (k);

(j) counting down said counter;

(k) loading said counter with another number when said latter counting down of said counter has been completed;

(l) counting down said counter;

(m) checking said physical sector counter to see if said physical sector counter has been decremented to zero;

(n) checking for an address mark associated with the selected predetermined field if said physical sector counter has been decremented to zero, and if said address mark is detected, read said field and if not, go to step (o);

(o) loading said counter with another number;

(p) counting down said counter;

(q) checking for an expected address mark while said counter is being counted down;

(r) loading said counter with another number if said expected address mark is detected during said latter counting down of said counter and go to step (v), but if said second expected address mark is not detected, loading said counter with said latter number and go to step (s);

(s) counting down said counter;

(t) checking for said expected address mark during said latter counting down of said counter;

(u) reloading said counter with said latter number if said expected address mark is detected during said latter counting down of said counter and go to step (v), but if said second expected address mark is not detected, go to step (w);

(v) counting down said counter;

(w) loading said counter with another number;

(x) decrementing said physical sector counter;

(y) checking the status of said physical sector counter to see if it has been decremented to zero and if it has been decremented to zero, (i) check said command register to identify the field to be read, (ii) check for the address mark associated with the field selected and (iii) if the address mark is detected, read the field and terminate the step, if not, go to step (z);

(z) loading said counter with another number and go to step (d).

6. A method according to claim 5 wherein each of said numbers corresponds to the length of one or more of said plurality of fields.

7. An apparatus for reading a selected field from among a plurality of fields on a disk wherein said disk comprises a plurality of field address marks, each of said plurality of fields having one of said field address marks associated therewith and wherein one or more of said field address marks, other than the address mark associated with said selected field, is unreadable and said disk comprises an index mark and a spindle speed which may vary, comprising:

means for detecting said index mark;

means for generating signals for providing a first plurality of successive time windows in response to a detecting of said index mark by said detecting means, wherein each of said time windows is associated with a predetermined one of said plurality of address marks and occurs at a time and has a duration within which said associated one of said address marks is expected to occur;

means for enabling an address mark detecting apparatus during each of said time windows for detecting an address mark which may occur within said time window;

means for restarting said time window generating means to provide another plurality of said successive time windows each time one of said address marks is detected within an associated one of said plurality of time windows; and means for reading said selected one of said predetermined fields when the address mark associated with said selected field is detected within said time window associated therewith.

8. An apparatus according to claim 7 wherein said generating means comprises means for generating a time window having a width which is greater than twice the maximum expected variation of disk spindle speed between expected adjacent address marks.

9. An apparatus according to claim 1 wherein said generating means comprises means for generating successive time windows which are separated by at least one of said plurality of fields.

10. An apparatus according to claim 1 wherein said generating means comprises:
a counting means;
means for storing in said counting means a number corresponding to the length of one or more of said fields; and
means for counting down said counting means; and
said restarting means comprises means for detecting an address mark while said counting means is being counted down; and
means responsive to said detecting means for starting or restarting said counting means with a number corresponding to the length of one or more of said fields following said address mark for synchronizing said counting means with the detection of said address mark.

* * * * *